United States Patent
Sugiyama et al.

(10) Patent No.: US 6,559,095 B2
(45) Date of Patent: May 6, 2003

(54) EXHAUST GAS PURIFYING CATALYST

(75) Inventors: Tomomi Sugiyama, Saitama (JP); Kazuhide Terada, Saitama (JP); Takeshi Narishige, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 42 days.

(21) Appl. No.: 09/817,232

(22) Filed: Mar. 27, 2001

(65) Prior Publication Data

US 2001/0041658 A1 Nov. 15, 2001

(30) Foreign Application Priority Data

Apr. 7, 2000 (JP) ......................................... 2000-106125

(51) Int. Cl.⁷ ............................. B01J 23/40; B01J 23/42
(52) U.S. Cl. .................. 502/326; 502/327; 502/527.19
(58) Field of Search .................................. 502/325, 326, 502/327, 213.5, 239.1, 527.19, 439

(56) References Cited

U.S. PATENT DOCUMENTS

| | | | | | |
|---|---|---|---|---|---|
| 4,130,506 A | * | 12/1978 | Collier et al. | ................ | 252/438 |
| 4,274,877 A | * | 6/1981 | Collier et al. | ................ | 75/252 |
| 4,977,129 A | * | 12/1990 | Ernest | ........................ | 502/330 |
| 6,025,296 A | * | 2/2000 | Takemoto et al. | .......... | 502/232 |
| 6,261,990 B1 | * | 7/2001 | Terada et al. | ............... | 502/325 |

FOREIGN PATENT DOCUMENTS

| | | |
|---|---|---|
| JP | 6-31173 A | 2/1994 |
| JP | 8-1006 A | 1/1996 |
| JP | 10-94730 A | 4/1998 |

* cited by examiner

Primary Examiner—Stanley S. Silverman
Assistant Examiner—Cam N. Nguyen
(74) Attorney, Agent, or Firm—Arent Fox Kintner Plotkin & Kahn, PLLC

(57) ABSTRACT

An exhaust gas purifying catalyst has an Ir powder. The Ir powder has a two peak particle size distribution, with a peak in a particle size D>25 nm region, and the other peak in a particle size D<25 nm region, respectively.

8 Claims, 6 Drawing Sheets

EXHAUST GAS PURIFYING CATALYST

BACKGROUND OF THE INVENTION

1. Field of the Invention

The present invention relates to an exhaust gas purifying catalyst to be used for an exhaust system of a lean burn gasoline engine, or the like, specifically, it relates to a catalyst having an Ir powder.

The present application is based on Japanese Patent Application No. 2000-106125, which is incorporated herein by reference.

2. Description of the Related Art

Conventionally, as an Ir powder in this kind of a catalyst, those having a particle size distribution with a peak in a particle size $D \geq 25$ nm have been used.

However, the conventional catalysts involve a problem in that the oxidization performance with respect to a CO, and an HC is low in the case of driving the engine by the theoretical air fuel ratio. The low oxidization performance is considered to be derived from a low dispersion degree because the Ir powder with the particle size distribution contains many particles with a relatively small specific surface area, and thus with a relatively large particle size in view of improvement of the oxidization performance.

SUMMARY OF THE INVENTION

Accordingly, an object of the invention is to provide a catalyst, capable of providing a good oxidation performance in driving an engine by the theoretical air fuel ratio, and the excellent durability even in the case it is directly exposed to an oxygen excessive atmosphere under a high temperature.

In order to achieve the object, according to the invention, an exhaust gas purifying catalyst having an Ir powder, wherein the Ir powder has a two peak particle size distribution, with a peak in a particle size $D>25$ nm region, and the other peak in a particle size $D<25$ nm region, respectively, is provided.

In the Ir powder particle size distribution, existence of a peak in a particle size $D<25$ nm region means existence of many Ir particles with a large specific surface area, that is, a small particle size. The many Ir particles with a small particle size have a large dispersion degree, and thus the catalyst provides a good oxidation performance in a drive of an engine by the theoretical air fuel ratio so as to maintain the CO, HC purifying ratio at a high level.

In contrast, existence of a peak in a particle size $D>25$ nm region means existence of many Ir particles with a small specific surface area, that is, a large particle size. The many Ir particles with a large particle size can hardly be oxidized even in the case they are directly exposed to an oxygen excessive atmosphere under a high temperature so as to provide the excellent durability, and thereby, the catalyst also maintains a high NOx purifying ratio after aging.

Features and advantages of the invention will be evident from the following detailed description of the preferred embodiments described in conjunction with the attached drawings.

DETAILED DESCRIPTION OF THE PREFERRED EMBODIMENTS

Figure 1:
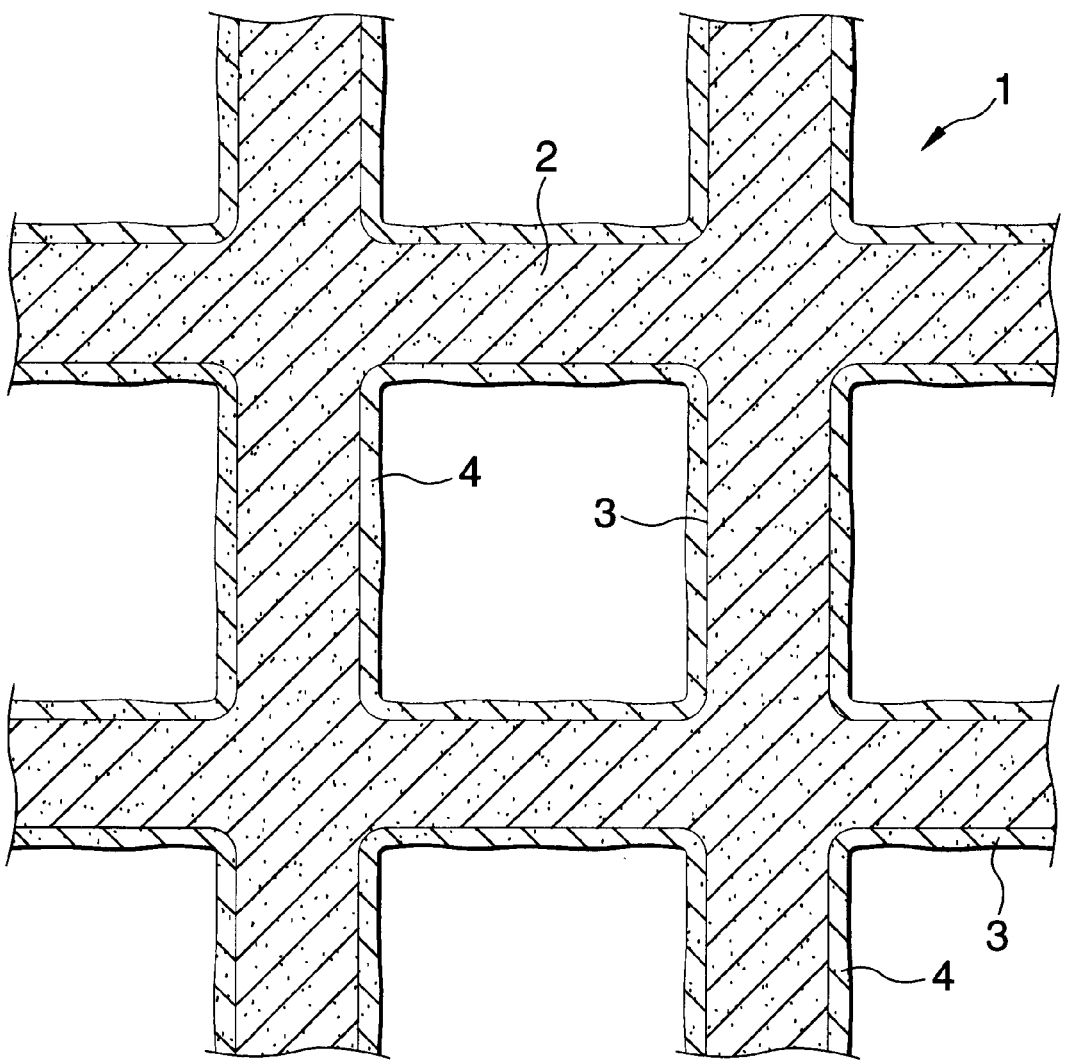
FIG. 1 is a principal part cross-sectional view of a purifier having a catalyst.

An exhaust gas purifier 1 comprises a heat resistant honeycomb 2, and a catalyst 4 supported on the inner surface of each cell 3 as shown in FIG. 1.

The catalyst 4 has an Ir powder, with Ir particles comprising the Ir powder, supported on the surface of $TiO_2$ particles as the support. K particles and Zr particles are also supported on the surface of the $TiO_2$ particles.

The Ir particles contribute to a reducing reaction of $NOx+HC+O_2 \rightarrow N_2+CO_2+H_2O$ with an HC as a reducing agent in an oxygen excessive atmosphere. Moreover, the Ir particles contribute to an oxidizing reaction of $HC+O_2 \rightarrow H_2O+CO_2$, and $CO+O_2 \rightarrow CO_2$ in an engine drive by the theoretical air fuel ratio.

The K particles serve for promoting the above reducing reaction using the HC as the reducing agent by restraining oxidation of the HC by the Ir particles in the oxygen excessive atmosphere. Moreover, the Zr particles serve for improving the durability of the catalyst.

Figure 2:
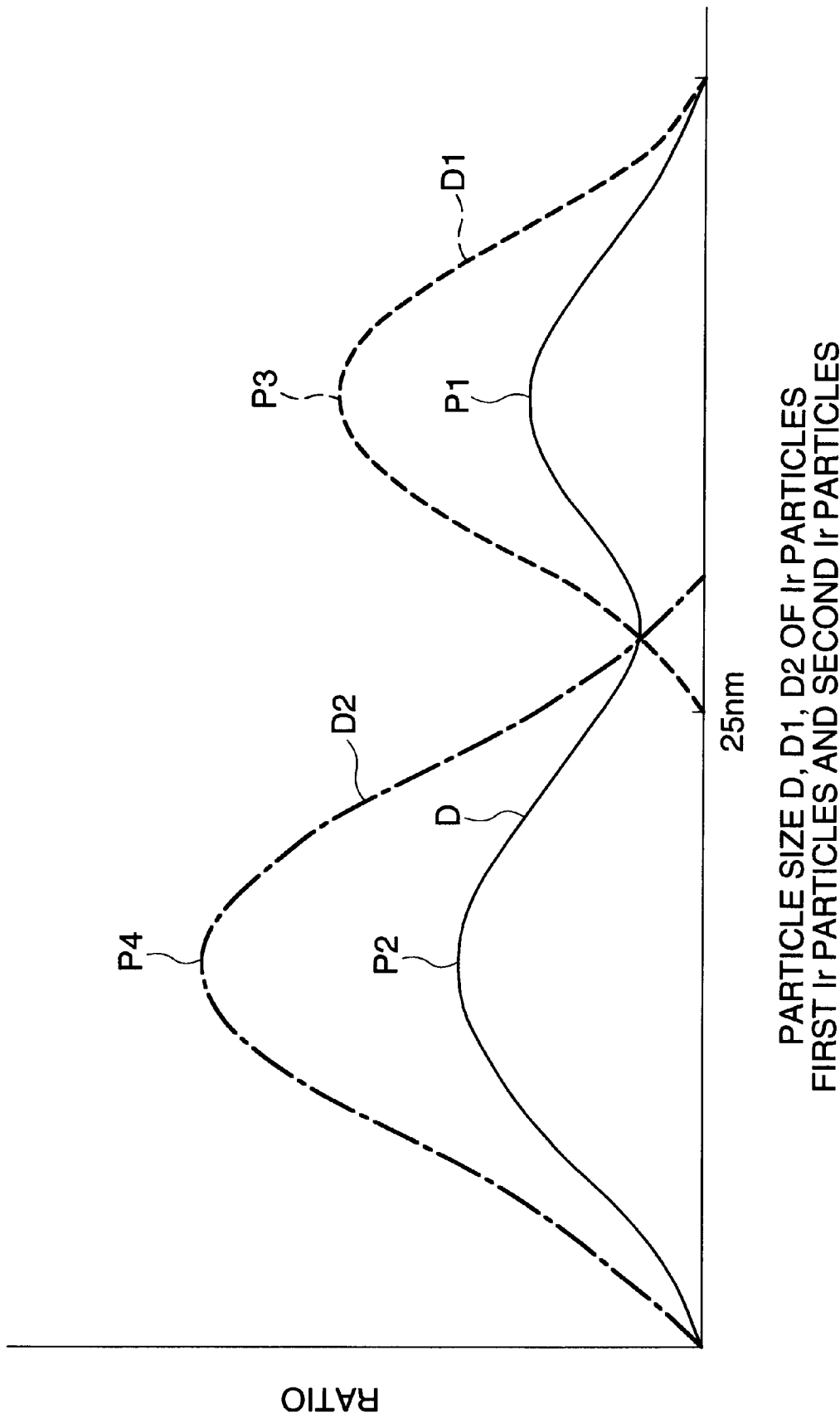
FIG. 2 is a graph describing the particle size distribution of a first Ir powder, a second Ir powder, and an Ir powder.

As shown by the solid line in FIG. 2, the Ir powder has a two peak particle size distribution, with a peak P1 in a particle size $D>25$ nm region, and the other peak P2 in a particle size $D<25$ nm region, respectively. In the embodiment, the Ir powder is a mixture of a first Ir powder having a particle size distribution with a peak P3 in a particle size $D1>25$ nm region as shown by the dotted line in FIG. 2, and a second Ir powder having a particle size distribution with a peak P4 in a particle size $D2<25$ nm region as shown by the chain line in FIG. 2.

In the Ir powder particle size distribution, existence of a peak P1 in a particle size $D>25$ nm region means existence of many Ir particles with a small specific surface area, that is, a large particle size. The many Ir particles with a large particle size can hardly be oxidized even in the case they are directly exposed to an oxygen excessive atmosphere under a high temperature so as to provide the excellent durability, and thereby, the catalyst 4 also maintains a high NOx purifying ratio after aging.

In contrast, existence of a peak P2 in a particle size $D<25$ nm region means existence of many Ir particles with a large specific surface area, that is, a small particle size. The many Ir particles with a small particle size have a high dispersion degree, and thus the catalyst 4 provides a good oxidation performance in a drive of an engine by the theoretical air fuel ratio so as to maintain the CO, HC purifying ratio at a high level.

Hereinafter, specific embodiments will be described.

A-1. Production of a First Catalyst Powder Containing a First Ir Powder (1) 40 kg of a deionized water was added to 1,924 g of a commercially available $TiO_2$ powder (specific surface area 16 $m^2$/g). By agitating the same for 20 minutes, a $TiO_2$ slurry was obtained.

(2) A liquid mixture of 3,200 g of a deionized water containing an $H_2IrCl_6$ (iridium chloride acid) corresponding to 24 g of a metal Ir, 3,200 g of a deionized water containing a KCl (potassium chloride) corresponding to 16 g of a metal K, and 3,200 g of a deionized water containing a $ZrOCl_2 \cdot 8H_2O$ (octahydrate zirconium chloride oxide) corresponding to 36 g of a metal Zr was added to the $TiO_2$ slurry so as to prepare a material liquid.

(3) The material liquid was introduced into a glass lining dish with a steam jacket. It was agitated for 10 hours for evaporating the water content so as to obtain a solid matter.

(4) The solid matter was dried at 105° C. for 16 hours by an electric drier, and then, it was pulverized. The powder was placed in a quartz tray, and it was applied with a primary baking process at 800° C. for 2 hours in the air by an electric furnace. Furthermore, the powder applied with the primary baking was applied with a secondary baking process at 800° C. for 2 hours in a 100% nitrogen flow.

As a result of a component analysis of the first catalyst powder accordingly obtained, it was revealed that it has a composition of 1.2 wt % Ir—0.8 wt % K—1.8 wt % Zr—remainder $TiO_2$ [Ir/K/Zr=1/3.3/3.2 by the atomic ratio] based on the metal.

Figure 3:
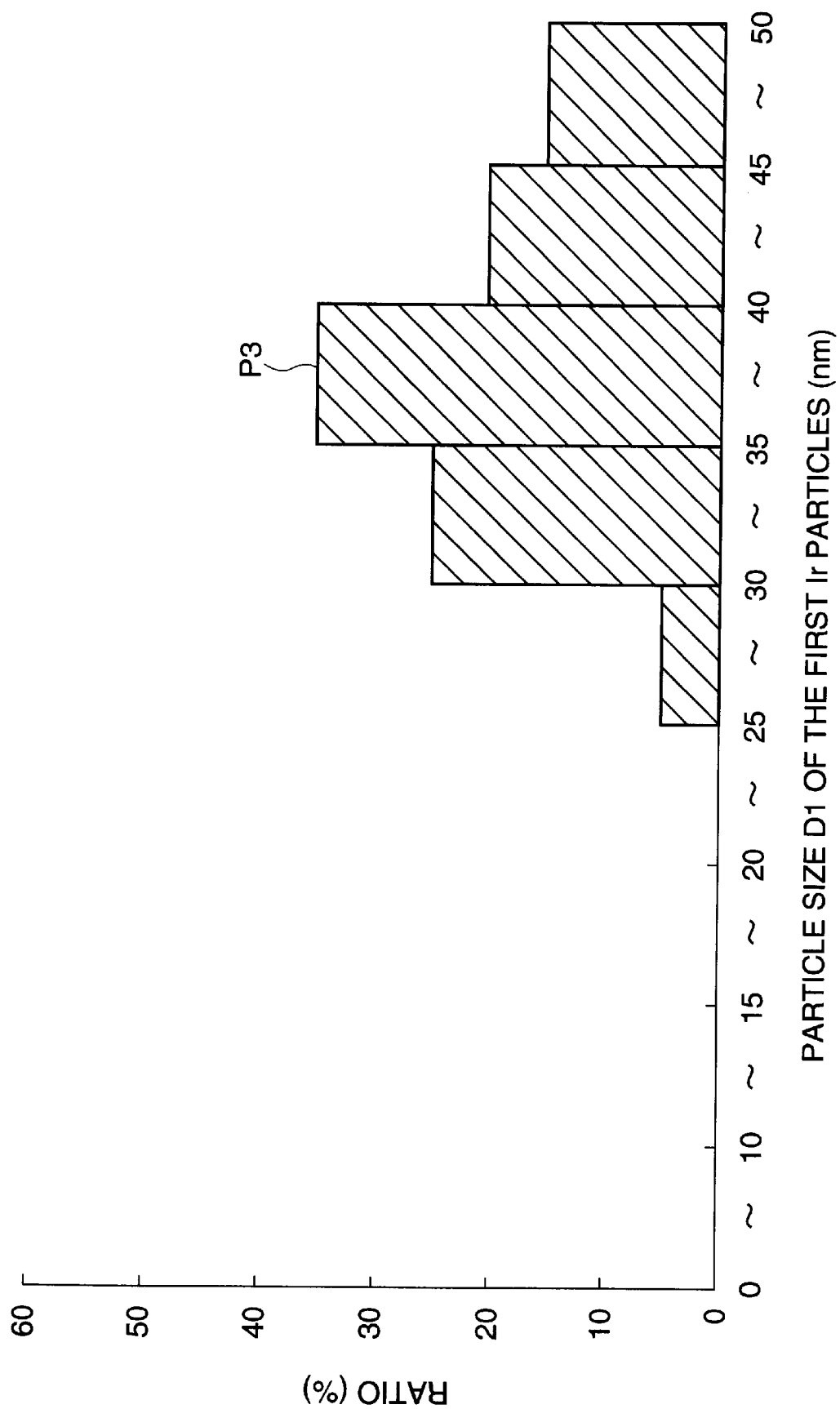
FIG. 3 is a graph showing the particle size distribution of the first Ir powder.

Moreover, from the analysis of an electron microscope photography image, it was revealed that the first Ir powder in the first catalyst powder has a particle size distribution with a particle size D1 range in 25 nm≦D1≦50 nm, and a peak P3 in a D1>25 nm region, that is, a 35 nm≦D1≦40 nm region as shown in FIG. 3.

A-2. Production of a Second Catalyst Powder Containing a Second Ir Powder

In the same process as in the production of the first catalyst powder except that the water content evaporation time in the glass lining dish with a steam jacket in the production of the first catalyst powder set in 4 hours, a second catalyst powder was obtained.

Figure 4:
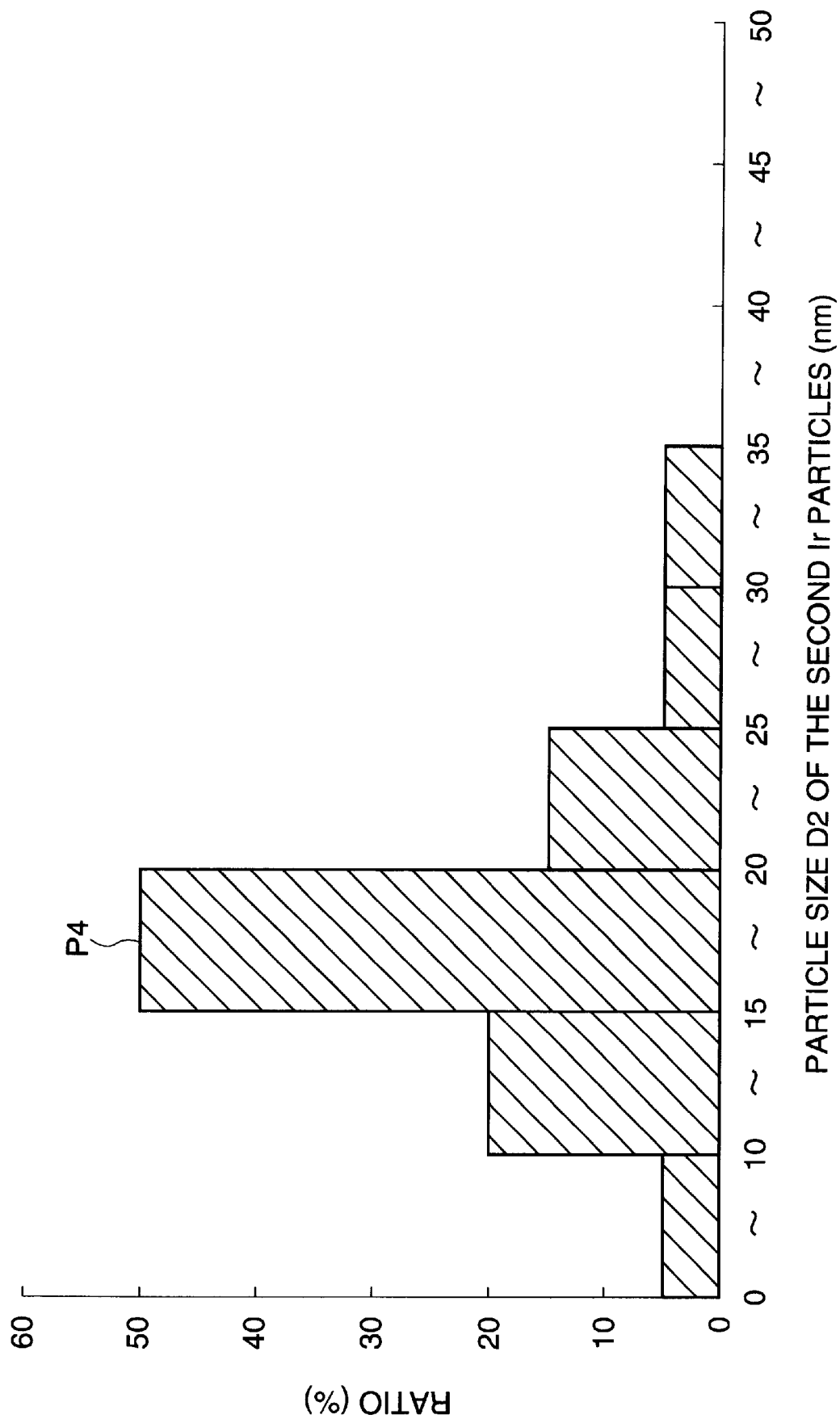
FIG. 4 is a graph showing the particle size distribution of the second Ir powder.

As a result of a component analysis of the second catalyst powder accordingly obtained, it was revealed that it has a composition of 1.2 wt % Ir—0.8 wt % K—1.8 wt % Zr—remainder $TiO_2$ [Ir/K/Zr=1/3.3/3.2 by the atomic ratio] based on the metal as the first catalyst powder. Moreover, from the analysis of an electron microscope photography image, it was revealed that the second Ir powder in the second catalyst powder has a particle size distribution with a particle size D2 range in 0<D2≦35 nm, and a peak P4 in a D2<25 nm region, that is, a 15 nm≦D2≦20 nm region as shown in FIG. 4.

B. Production of a Purifier

With the mixing ratio a/b of the first and second catalyst powder weight ratios a, b changed as shown in the table 1 and the weight total sum of the powders set at 1,800 g, embodiments (1) to (7) of mixed catalyst powders were obtained.

TABLE 1

| Mixed catalyst powder | Weight ratio a of the first catalyst powder | Weight ratio b of the second catalyst powder | Mixing ratio a/b |
|---|---|---|---|
| Embodiment (1) | 0 | 10 | 0/10 |
| Embodiment (2) | 1 | 9 | 1/9 |
| Embodiment (3) | 3 | 7 | 3/7 |
| Embodiment (4) | 5 | 5 | 5/5 |

TABLE 1-continued

| Mixed catalyst powder | Weight ratio a of the first catalyst powder | Weight ratio b of the second catalyst powder | Mixing ratio a/b |
|---|---|---|---|
| Embodiment (5) | 7 | 3 | 7/3 |
| Embodiment (6) | 9 | 1 | 9/1 |
| Embodiment (7) | 10 | 0 | 10/0 |

(i) 3,600 g of a deionized water and 240 g of an alumina sol (10 wt % $Al_2O_3$) were added to the embodiment (1), and mixed. Then, the mixture was introduced in a ball mill for executing a wet pulverization for 5 hours so as to obtain a slurry.

(ii) A cordierite honeycomb with 400 cells/in$^2$, a 120 mm diameter and a 110 mm length was soaked in the slurry. It was pulled up and applied with an air blow for eliminating the excessive slurry.

(iii) The honeycomb with the slurry was applied with a drying treatment at 300° C. for 20 minutes, and then, it was applied with a baking treatment at 500° C. for 3 hours in the air so as to obtain an embodiment (1) of the purifier 1.

The coat amount of the Ir—K—Zr/$TiO_2$ catalyst 4 in the embodiment (1) of the purifier was 100 g per 1L honeycomb volume based on the dry weight. In the same process, with the embodiments (2) to (7) of the mixed catalyst powders, embodiments (2) to (7) of the purifier 1 corresponding thereto were obtained.

Figure 5:
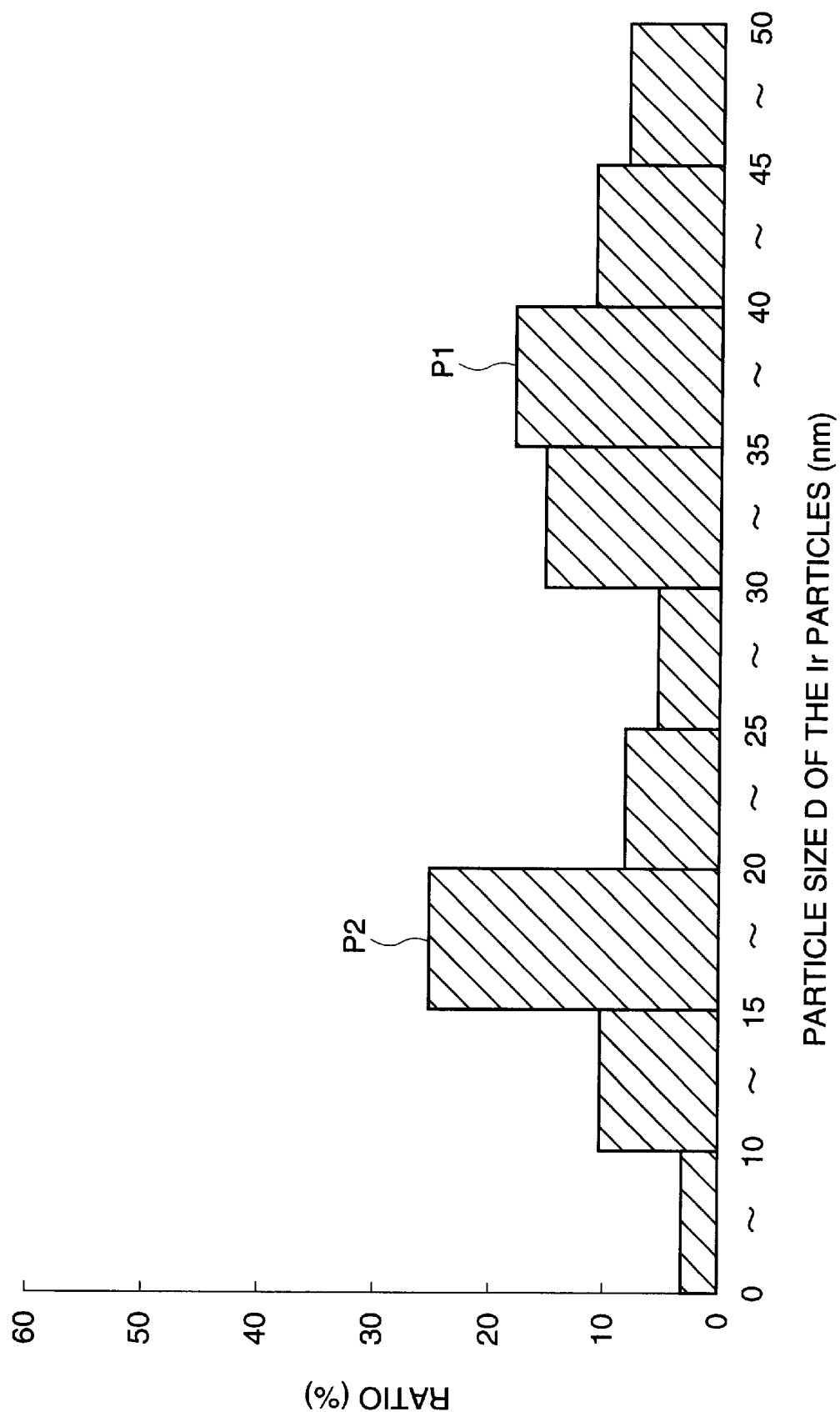
FIG. 5 is a graph showing the particle size distribution of the Ir powder.

FIG. 5 shows the particle size distribution of the Ir powder in the embodiment (4) of the purifier 1. From the figure, it is observed that the Ir powder has a two peak particle size distribution, with a peak P1 in a particle size D>25 nm region, that is, in a 35 nm≦D1≦40 nm region, and the other peak P2 in a particle size D<25 nm region, that is, in a 15 nm ≦D≦20 nm region, respectively in a particle size D range 0<D≦50nm range. The particle size distribution was obtained by the same method as mentioned above. Moreover, the embodiments (2), (3), (5), (6) of the purifier 1 also have a two peak particle size distribution.

C-1. Initial HC Purifying Test

The table 2 shows the composition of the exhaust gas discharged from an engine. In the table 2, T-HC represents the total hydrocarbon. The T-HC contains various kinds of saturated HC and unsaturated HC.

TABLE 2

| Exhaust gas | |
|---|---|
| Component | Content |
| $O_2$ | 7.4 vol % |
| $CO_2$ | 9.5 vol % |
| T-HC | 2800 ppmC |
| CO | 800 ppm |
| $NO_X$ | 130 ppm |
| $H_2$ | 300 ppm |
| $H_2O$ | 10 vol % |
| $N_2$ | Remainder |

With each purifier 1 in a fresh state set in a fixed bed flow type catalyst reactor, the exhaust gas shown in the table 2 was supplied with a $3.5 \times 10^4$/h space velocity S. V. as well as the gas temperature before the purifier was raised from an ordinary temperature to 500° C. by a 20° C./min temperature rise rate for measuring the HC purifying ratio at the temperature.

C-2. NOx Purifying Test After Aging

With each purifier 1 assembled in an exhaust system of a lean burn gasoline engine, the engine was driven for 100 hours such that the purifier 1 temperature becomes 750° C. in an oxygen excessive atmosphere (A/F=19) for applying a 100 hour aging process to each catalyst. Then, an automobile with the engine and the purifier 1 mounted was run according to the domestic 10–15 mode run for measuring the NOx purifying ratio by each purifier 1.

C-3. Discussion

Figure 6:
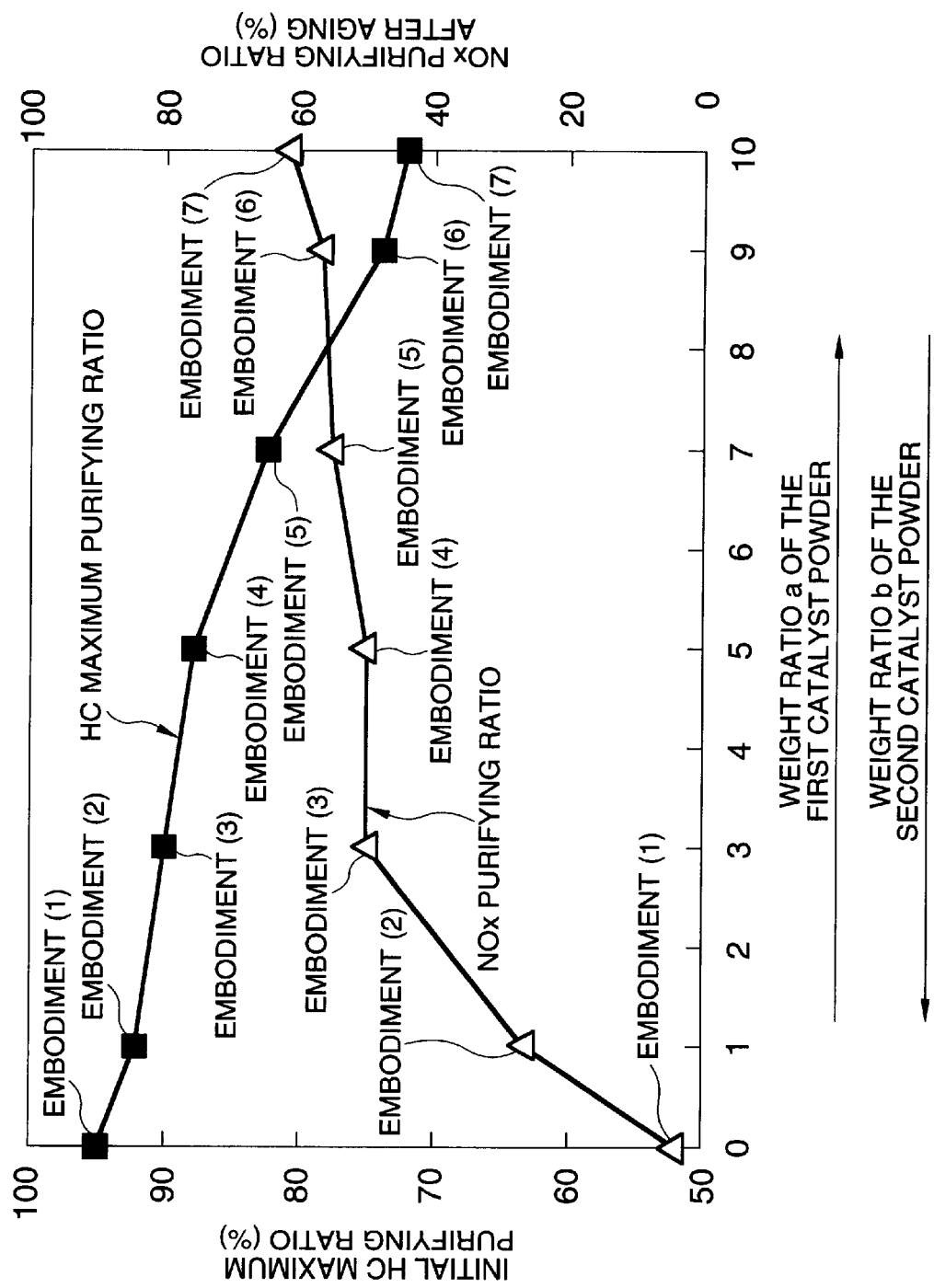
FIG. 6 is a graph showing the relationship between the weight ratio of the first and second catalyst powders, the initial HC maximum purifying ratio and the NOx purifying ratio after aging.

In FIG. 6, it is observed that the initial HC maximum purifying ratio is improved when the amount of the second catalyst powder, that is, of the second Ir powder is increased, and in contrast, the NOx purifying ratio after aging is improved when the amount of the first catalyst powder, that is, of the first Ir powder is increased. The mixing ratio a/b of the first and second catalyst powders is preferably $3/7 \leq a/b \leq 7/3$. Thereby, a catalyst with high initial HC purifying ratio and NOx purifying ratio after aging can be provided.

In this kind of a catalyst, the initial performance can be stabilized by appropriately adjusting the Ir oxidization state, that is, the valence. As a process for adjusting the valence, for example, an activation process under a vapor atmosphere can be presented.

In preparing a catalyst, in addition to the above-mentioned evaporation-dry solidification process, conventionally commonly used process methods such as spray drying, water absorption, and soaking can also be used. Moreover, in the case of supporting an Ir, a K and a Zr on a $TiO_2$, in addition to the above-mentioned simultaneous support, a consecutive support can also be adopted. As the starting material of the Ir, K, and Zr, in addition to the above-mentioned, for example, a nitrate, a sulfate, a carbonate, a chloride, or the like can also be used. The atmosphere for the baking decomposition can be selected optionally from in the air, in a vacuum, in an inert gas flow of a nitrogen, or the like, in a hydrogen flow, or the like, depending on the kind of the starting material. The baking temperature is preferably 300 to 1,000° C., more preferably 600 to 900° C. The baking time can be selected optionally. In general, it is 5 minutes to 20 hours, preferably 10 minutes to 5 hours. For example, a baking method of executing a primary baking at 600 to 800° C. in the air, and a secondary baking at 600 to 900° C. in a nitrogen flow or a hydrogen flow can be presented.

According to the invention, by providing the above-mentioned configuration, an exhaust gas purifying catalyst, capable of providing a good oxidation performance in driving an engine by the theoretical air fuel ratio so as to maintain the HC, CO purifying ratio at a high level, and the excellent durability even in the case it is directly exposed to an oxygen excessive atmosphere under a high temperature so as to maintain the NOx purifying ratio at a high level.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An exhaust gas purifying catalyst having an Ir powder, wherein the Ir powder has a two peak particle size distribution, with a first peak in a particle size D>25 nm region, and a second peak in a particle size D<25 nm region, respectively.

2. An exhaust gas purifying catalyst according to claim 1, wherein the Ir powder is a mixture of a first Ir powder and a second Ir powder, wherein the first Ir powder has a particle size distribution with a peak in a particle size D1>25 nm region, and the second Ir powder has a particle size distribution with a peak in a particle size D2<25 nm region.

3. An exhaust gas purifying catalyst according to claim 2, wherein the first Ir powder has a particle size distribution with a particle size D1 range in 25 nm<D1<50 nm and a peak in a 35 nm<D1<40 nm region, and the second Ir powder has a particle size distribution with a particle size D2 range in 0<D2<35 nm and a peak in a 15 nm<D2<20 nm region.

4. An exhaust gas purifying catalyst according to claim 2, wherein the first Ir powder is contained in a first catalyst powder, and the second Ir powder is contained in a second catalyst powder, respectively, with a powder mixture ratio a/b of the weight ratio of the first catalyst powder a and the weight ratio of the second catalyst powder b is $3/7 \leq a/b \leq 7/3$.

5. An exhaust gas purifier comprising:
   a honeycomb having a cell; and
   a catalyst supported on an inner surface of said cell of said honeycomb, said catalyst containing an Ir powder, wherein the Ir powder has a two peak particle size distribution, with a first peak in a particle size D>25 nm region, and a second peak in a particle size D<25 nm region, respectively.

6. An exhaust gas purifier according to claim 5, wherein the Ir powder is a mixture of a first Ir powder and a second Ir powder, wherein the first Ir powder has a particle size distribution with a peak in a particle size D1>25 nm region, and the second Ir powder has a particle size distribution with a peak in a particle size D2<25 nm region.

7. An exhaust gas purifier according to claim 6, wherein the first Ir powder has a particle size distribution with a particle size D1 range in 25 nm≦D1≦50 nm and a peak in a 35 nm≦D1≦40 nm region, and the second Ir powder has a particle size distribution with a particle size D2 range in 0≦D2≦35 nm and a peak in a 15 nm≦D2≦20 nm region.

8. An exhaust gas purifier according to claim 6, wherein the first Ir powder is contained in a first catalyst powder, and the second Ir powder is contained in a second catalyst powder, respectively, with a powder mixture ratio a/b of the weight ratio of the first catalyst powder a and the weight ratio of the second catalyst powder b is $3/7 \leq a/b \leq 7/3$.

* * * * *